United States Patent [19]

Furuichi et al.

[11] 4,324,866
[45] Apr. 13, 1982

[54] THERMOPLASTIC ELASTOMER COMPOSITION

[75] Inventors: Minoru Furuichi; Chikara Honma; Noriaki Ando, all of Yokkaichi, Japan

[73] Assignee: Japan Synthetic Rubber Co., Ltd., Tokyo, Japan

[21] Appl. No.: 180,427

[22] Filed: Aug. 22, 1980

[30] Foreign Application Priority Data

Aug. 27, 1979 [JP] Japan ................... 54-108126

[51] Int. Cl.$^3$ .................. C08L 9/00; C08L 23/20
[52] U.S. Cl. .................. 521/140; 525/232; 525/236; 525/233; 525/237; 525/914
[58] Field of Search ............... 525/232, 236, 237, 914; 260/5, 42.47; 521/140

[56] References Cited

U.S. PATENT DOCUMENTS

| | | | |
|---|---|---|---|
| 2,897,164 | 7/1959 | Ford et al. .................... | 260/5 |
| 3,639,525 | 2/1972 | Kent ........................... | 525/237 |
| 4,108,947 | 8/1978 | Kimura et al. | |
| 4,220,564 | 9/1980 | Tanimoto et al. ............. | 525/236 |

FOREIGN PATENT DOCUMENTS 54-582879 3/1979 Japan .
54-3902579 11/1979 Japan .

Primary Examiner—Wilbert J. Briggs, Sr.
Attorney, Agent, or Firm—Oblon, Fisher, Spivak, McClelland & Maier

[57] ABSTRACT

An uncrosslinked thermoplastic elastomer composition comprising:
(A) 35–95% by weight of a 1,2-polybutadiene having a 1,2-configuration content of 70% or more, a crystallinity of 5–40% by weight and [η] of 0.7 dl/g or more as measured at 30° C. in toluene,
(B) 1–20% by weight of an isobutylene polymer or an isobutylene-isoprene copolymer (preferably having a degree of unsaturation of 0–5 mole % and a viscosity average molecular weight of 7,000–80,000),
(C) 5–40% by weight of a polybutadiene rubber having a 1,4-configuration content of 80% or more and
(D) 0–30% by weight, preferably 5–30% by weight, of at least one member selected from the group consisting of isoprene rubber, natural rubber, acrylonitrile-butadiene rubber, styrene-butadiene rubber and ethylene-propylene type rubbers, wherein, preferably, (B)/{(C)+(D)}=2/1–1/20. Said composition is rich in flexibility, excellent in abrasion resistance, adhesiveness, paint-compatibility, low temperature characteristics and snappiness as well as in moldability and processability, and easy to foam.

7 Claims, No Drawings

THERMOPLASTIC ELASTOMER COMPOSITION

This invention relates to an uncrosslinked thermoplastic elastomer composition excellent in moldability, processability, foaming property, flexibility, abrasion resistance, adhesiveness, and paint-compatibility and well balanced in physical properties.

Hitherto, thermoplastic elastomers have been used as various molding materials making the best use of their characteristic features that they are easy to mold and have an appropriate strength.

Recently, however, there is an increasing desired from both aspects of texture and practicability to obtain a thermoplastic elastomer which has excellent characteristic properties particularly in flexibility and abrasion resistance, is easy to mold and well balanced in physical properties and is excellent in adhesiveness and paint-compatibility.

Nevertheless, flexibility and abrasion resistance are in a physically contradictory relationship (an increased flexibility tends to injure abrasion resistance), so that the above-mentioned desire can be said to be quite difficult to satisfy.

None of the many thermoplastic elastomers hitherto known can satisfy these requirements. That is, polyurethane which is one of the known thermoplastic elastomers is poor in moldability and processability and expensive, so that it can be used in limited fields.

Plasticized vinyl chloride polymers and ethylene-vinyl acetate copolymers (hereinafter simply referred to as EVA) which are thermoplastic materials relatively rich in flexibility can also be used in some fields of elastomer. However, the former have a fault that its flexibility is dependent on temperature and its quality is instable with a change in ambient temperature. It is particularly poor in low temperature characteristics and its use is limited in the cold districts. Furthermore, it is unsatisfactory in heat stability at the time of molding, in odor, in the migration of plasticizer in molded articles, in specific gravity, etc. As to the EVA, a product of a high vinyl acetate content has to be used when a greater flexibility is required, which brings about a rise in cost and a decrease in processability in respect of occurrence of stickiness to mold and taking a long period of time for cooling. Furthermore it has a problem that mechanical strengths typified by tensile strength and tear strength as well as endurance typified by abrasion resistance and flex resistance drop markedly. When a low vinyl acetate content EVA is used, the product becomes rigid, so that such a composition is regarded as a low class of thermoplastic resin. Its behavior becomes close to that of polyethylene and the secondary processabilities such as adhesiveness, paint-compatibility and the like deteriorate extremely, so that it can be used only in quite limited fields.

Blends (mainly 50/50 blend) of 1,2-polybutadiene having a crystallinity of 15-25% and EVA are also used in this sort of field of elastomer. Although they relatively satisfy the required performances, they are still unsatisfactory in respects of flexibility and abrasion resistance.

There are many other thermoplastic elastomers such as styrene-conjugated diene block copolymers, ionomers containing metal ion linkages, ethylene-olefin copolymers and the like. However, they are unsatisfactory in balance between processability, endurance, flexibility, foaming property, adhesiveness and other physical properties, so that their application field is limited. Further, many of these elastomers are expensive.

The present inventors have conducted a study with the aim of obtaining a thermoplastic elastomer composition excellent in characteristic properties particularly in flexibility and abrasion resistance, easy to mold, well balanced in physical properties and excellent in adhesiveness and paint-compatibility. As a result, it has been found that the above-mentioned object can be achieved by a combination of a specified 1,2-polybutadiene, isobutylene polymer or isobutyleneisoprene copolymer and a 1,4-polybutadiene rubber.

It is an object of this invention to provide a thermoplastic elastomer composition having the characteristic properties that the flexibility and abrasion resistance are excellent.

It is another object of this invention to provide a thermoplastic elastomer composition which is easy to mold and well balanced in physical properties.

It is yet another object of this invention to provide a thermoplastic elastomer excellent in adhesiveness and paint-compatibility.

Other objects and advantages of this invention will become apparent from the following description.

According to this invention, there is provided a thermoplastic elastomer composition rich in flexibility, excellent in abrasion resistance, adhesiveness, paint-compatibility, low temperature characteristics and snappiness, and also excellent in moldability and processability, which comprises (A) 35-95% by weight of 1,2-polybutadiene having a 1,2-configuration content of 70% or more, a crystallinity of 5-40% by weight and $[\eta]$ of 0.7 dl/g or more as measured at 30° C. in toluene (hereinafter, 1,2-polybutadiene is simply referred to as 1,2-PBD), (B) 1-20% by weight of an isobutylene polymer or an isobutylene-isoprene copolymer (hereinafter referred to as PIB) and (C) 5-40% by weight of 1,4-polybutadiene rubber (hereinafter referred to as BR) as indispensable ingredients and (D) 30% by weight or less of at least one member selected from the group consisting of isoprene rubber (hereinafter referred to as IR), natural rubber (hereinafter referred to as NR), acrylonitrile-butadiene rubber (hereinafter referred to as NBR), styrene-butadiene rubber (hereinafter referred to as SBR) and ethylene-propylene type rubbers (hereinafter referred to as EPR) as an optional ingredient.

The 1,2-PBD which is used as the ingredient (A) in the composition of this invention must have a 1,2-configuration content of 70% or more, a crystallinity of 5-40% by weight and $[\eta]$ of 0.7 dl/g or more as measured at 30° C. in toluene. If the 1,2-configuration content is less than 70%, the flow property is markedly deteriorated and the moldability and processability are injured. If the crystallinity is less than 5%, the abrasion resistance, mechanical strength and moldability are decreased, while if it exceeds 40% the flexibility is injured. If $[\eta]$ is less than 0.7 dl/g, the processability and abrasion resistance are injured.

In the composition of this invention, the ingredient (A) is an indispensable ingredient. Though a composition having a similar flexibility can be obtained from only the ingredients (B), (C) and, if desired, the ingredient (D) without using the ingredient (A), such a composition is inferior to the composition of this invention in moldability and processability.

The ingredient (B) is an isobutylene polymer or an isobutylene-isoprene copolymer obtained by the known process which preferably has a degree of unsaturation of 0–5 mole% and a viscosity average molecular weight of 7,000–80,000. If the degree of unsaturation exceeds 5 mole%, the weather resistance and heat resistance tend to become unsatisfactory. Though a composition having a similar flexibility can be obtained from only the ingredients (A), (C) and (D) without using the ingredient (B), it is inferior to the composition of this invention in secondary processabilities such as adhesiveness, paint-compatibility and the like, as well as in weather resistance, heat resistance and moldability.

The ingredient (C) is 1,4-polybutadiene rubber of a high 1,4-configuration content (80% or more) obtained by a known process. Though a composition having a similar flexibility can be obtained from only the ingredients (A), (B) and (D) without using the ingredient (C), it is inferior to the composition of this invention in abrasion resistance, dynamic characteristics and low temperature characteristics.

As the ingredient (D), IR, NR, NBR, SBR (including random SBR and block SBR) or EPR is used. Though it is used in an amount of 0–30% by weight, it is preferable from the viewpoint of flexibility to use the ingredient (D) in an amount of 5–20% by weight.

The proportions of the above-mentioned ingredients (A), (B), (C) and (D) constituting the composition of this invention are (A) 35–95% by weight, preferably 50–90% by weight, of 1,2-PBD; (B) 1–20% by weight of PIB; (C) 5–40% by weight, preferably 5–20% by weight, of BR; (D) 0–30% by weight of at least one member of IR, NR, NBR, SBR and EPR.

If the proportion of the ingredient (A) is less than 35% by weight, the composition lacks elastic properties and troubles arise in moldability and abrasion resistance. If it exceeds 95% by weight, the flexibility is injured.

If the proportion of the ingredient (B) is less than 1% by weight, problems arise in the secondary processabilities such as adhesiveness, etc. If it exceeds 20% by weight, the moldability is injured.

If the proportion of the ingredient (C) is less than 5% by weight, the abrasion resistance becomes insufficient. If it exceeds 40% by weight, the moldability is injured.

If the proportion of the ingredient (D) exceeds 30% by weight, the moldability becomes worse and the mechanical strength decreases.

The ratio (B)/{(C)+(D)} between the constituents of the composition of this invention is preferably 2/1 to 1/20. If the amount of the ingredient (B) is small and the ratio is less than 1/20, neither adhesive effect nor flow effect can be obtained. If the ratio is made more than 2 by adding a larger amount of the ingredient (B), blooming occurs when the molecular weight of the ingredient (B) is low (particularly when its viscosity average molecular weight is less than 7,000) and the compatibility with the ingredient (C) becomes worse and, as a result, the abrasion resistance is decreased when the molecular weight of ingredient (B) is high (particularly when its viscosity average molecular weight exceeds 80,000).

The composition of this invention can be obtained by merely dry-blending the ingredients, or by mixing them by means of a kneading machine such as a roller, a Banbury mixer, a kneader, an extruder or the like. The temperature at the time of kneading is preferably 80°–100° C. in the case of roller, 100°–120° C. in the case of Banbury mixer, and 120°–150° C. in the case of extruder. The composition of this invention can also be pelletized by the use of a sheet pelletizer, a crusher or an extruder.

If necessary, it is possible to add, to the composition of this invention, a filler such as carbon black or the like; an oil such as naphthene oil or the like; a plasticizer such as dioctyl phthalate or the like; a softening agent; a lubricant such as a low molecular weight polymer (for example, a wax or the like), calcium stearate or the like; a stabilizer such as 2,6-di-tert-butyl-4-methylphenol or the like; a foaming agent such as an azo compound, a pigment such as titanium oxide or the like; and other compounding agents.

The composition of this invention is effective in the uses particularly requiring flexibility and abrasion resistance simultaneously, such as sole material, foamed sandal, and automobile bumper.

Further, the composition of this invention has a widely ranging characteristic properties in accordance with its composition ratio, and it can be extensively utilized also in the fields in which various thermoplastic elastomers have hitherto been used.

For example, it can be used in various uses such as functional parts of automobile, general goods including footwear (inner sole, unit sole, out sole, Japanese style sandal and the like), furniture parts, skidproof materials, and the like; bumper; packings; grip materials making the most of rubber-like character (golf club, ski stockings, autobikes and the like); tube; hose; daily necessaries (blow bottle and the like); toy parts; athletic goods (ball and the like); and the like.

This invention will be illustrated below in more detail referring to Examples which are not by way of limitation but by way of illustration.

Examples 1 and 2 and Comparative Examples 1–6

The compositions shown in Table 1 include commercially available compositions and compositions obtained by adding the ingredients shown in Table 1 to a Banbury mixer and kneading them at 100°–120° C. for about 15 minutes.

Test pieces were prepared from each composition, and their properties were measured to obtain the results shown in Table 1.

It is apparent from Table 1 that the compositions of this invention (Examples 1 and 2) are richer in flexibility than the compositions of the Comparative Examples (Comparative Examples 1, 2, 3, 4, 5 and 6), as proved by hardness and bending modulus.

Despite their excellent flexibility, the compositions of this invention are markedly superior in abrasion resistance and also excellent in flexcrack resistance. Thus, they are excellent materials which have never been known.

TABLE 1

| | | Example | | Comparative Example | | | | | |
|---|---|---|---|---|---|---|---|---|---|
| | | 1 | 2 | 1 | 2 | 3 | 4 | 5 | 6 |
| (Polymers constituting composition) | (% by wt.) | | | | | | | | |
| (A) 1,2-PBD-1 | Note 1 | 70 | 70 | | | | | | 50 |
| (C) BR-1 | Note 2 | 10 | 20 | | | | | | |
| (D) EPR | Note 3 | 10 | | | | | | | |
| (B) PIB-1 (polyisobutylene) | Note 4 | 10 | 10 | | | | | | |

TABLE 1-continued

|  |  | Example | | Comparative Example | | | | | |
|---|---|---|---|---|---|---|---|---|---|
|  |  | 1 | 2 | 1 | 2 | 3 | 4 | 5 | 6 |
| Polyethylene | Note 5 |  |  | 100 |  |  |  |  |  |
| Ethylene-olefin copolymer | Note 6 |  |  |  | 100 |  |  |  |  |
| EVA | Note 7 |  |  |  |  | 100 |  |  | 50 |
| PVC | Note 8 |  |  |  |  |  | 100 |  |  |
| Ionomer resin | Note 9 |  |  |  |  |  |  | 100 |  |
| (Properties of composition) |  |  |  |  |  |  |  |  |  |
| Density (g/cm³) | Note 10 | 0.90 | 0.91 | 0.92 | 0.89 | 0.93 | 1.29 | 0.96 | 0.91 |
| Hardness (JIS-A) | Note 11 | 80 | 78 | 96 | 95 | 93 | 93 | 96 | 92 |
| Bending modulus (kg/cm²) | Note 12 | 220 | 180 | 2500 | 2000 | 1000 | 300 | 1500 | 540 |
| Abrasion resistance (cc/HP-hr) | Note 13 | 15 (A) | 15(A) | 110 (D) | 130 (D) | 150 (D) | 80 (C) | 80 (C) | 130 (D) |
| Flexcrack resistance | Note 14 | A | A | D | C | D | D | C | B |

Note 1 JSR RB820 (1,2-content 92%, crystallinity 24.5%, [η] 1.25 dl/g as measured in toluene at 30° C.) manufactured by Japan Synthetic Rubber Co., Ltd.
Note 2 JSR BR02L (cis-1,4-content 94%, $ML_{1+4}$ (100° C.) 34) manufactured by Japan Synthetic Rubber Co., Ltd.
Note 3 JSR EP02P (ethylene-propylene rubber of ethylene content of 74% and $ML_{1+4}$ (100° C.) of 24) manufactured by Japan Synthetic Rubber Co., Ltd.
Note 4 VISTANEX LMMS (viscosity average molecular weight 7,000–8,000, degree of unsaturation 0%) manufactured by Esso Chemical Co.
Note 5 YUKARON YK-30 (polyethylene having MI of 4 g/10 min) manufactured by Mitsubishi Petrochemical Co., Ltd.
Note 6 TAFMER A 4085 (density 0.89 g/cm³, MI 4 g/10 min) manufactured by Mitsui Petrochemical Industries, Ltd.
Note 7 ULTRATHEN UE 633 (vinyl acetate content 20%, MI 20 g/10 min) manufactured by TOYO SODA MFG. CO., LTD.
Note 8 VINIKA Compound E-304 (Plasticized polyvinyl chloride having a density of 1.29 g/cm³ manufactured by Mitsubishi-Monsanto Co.
Note 9 SURLYN 1560 (Na ion type, MI 5 g/10 min) manufactured by E.I. du Pont.
Note 10 Density gradient tube method
Note 11 According to JIS K 6301
Note 12 According to ASTM D797-46
Note 13 Tested by Williams abrasion tester and evaluated according to the following criteria: A: 29 or less (Excellent) B: 30–59 (Good) C: 60–99 (Fair) D: 100 or more (Bad)
Note 14 After 120,000 times flexing by Ross flexing machine (ASTM D1052), the growth of crack was evaluated according to the following criteria: A: No crack B: Crack of 1–3 mm C: Crack of 4–9 mm D: Crack of 10 mm or more

Examples 3, 4, 5 and 6 and Comparative Examples 7, 8, 9, 10 and 11

The composition shown in Table 2 were obtained by adding the ingredients shown in Table 2 to a Banbury mixer and kneading them at 100°–120° C. for about 15 minutes.

The results mean that the compositions of this invention (Examples 3, 4, 5 and 6) are superior in performance to the compositions out of the blend composition ranges of this invention (Comparative Examples 7, 8, 9, 10 and 11). In other words, the compositions of Comparative Examples 7–11 do not satisfy the performances emphasized in this invention. That is, they have a fault in respect of flexibility, abrasion resistance, flexcrack resistance, moldability, processability and secondary processabilities (adhesiveness and paint-compatibility).

TABLE 2

|  |  | Example | | | | | Comparative Example | | | | |
|---|---|---|---|---|---|---|---|---|---|---|---|
|  |  | 3 | 4 | 2 | 5 | 6 | 7 | 8 | 9 | 10 | 11 |
| (Polymers constituting composition) (% by wt.) |  |  |  |  |  |  |  |  |  |  |  |
| (A) 1,2-PBD-1* |  | 50 | 60 | 70 | 80 | 90 | 90 | 90 | 50 | 30 | 0 |
| (C) BR* |  | 30 | 30 | 20 | 10 | 5 | 0 | 10 | 20 | 60 | 50 |
| (B) PIB* |  | 20 | 10 | 10 | 10 | 5 | 10 | 0 | 30 | 10 | 50 |
| (Properties of composition) |  |  |  |  |  |  |  |  |  |  |  |
| Density* (g/cm³) |  | 0.91 | 0.91 | 0.91 | 0.91 | 0.91 | 0.91 | 0.91 | 0.91 | 0.91 | 0.88 |
| Hardness* (JIS-A) |  | 76 | 77 | 78 | 84 | 86 | 90 | 90 | 75 | 68 | 61 |
| Bending modulus* |  | 150 | 160 | 180 | 280 | 350 | 380 | 400 | 140 | 120 | 110 |
| Abrasion resistance* (cc/Hp-hr) |  | 40 (B) | 40 (B) | 15 (A) | 20 (A) | 45 (B) | 170 (D) | 20 (A) | 120 (D) | 150 (D) | 220 (D) |
| Flexcrack resistance* |  | B | A | A | A | A | A | A | D | C | D |
| Adhesion | Note 1 | B | B | A | A | A | A | C | B | D | D |
| Paint-compatibility | Note 2 | B | B | A | A | A | A | C | B | D | D |
| Moldability | Note 3 | B | B | A | A | A | A | A | D | D | D |
| Appearance of molded product | Note 4 | B | A | A | A | A | A | A | C | D | D |

Note 1 By using BA747 and 172P manufactured by Sakai Kagaku Co. as primers and #550 manufactured by the same company as an adhesive, the adhesion was evaluated according to the following criteria:
A: Deep breakage of material (resin)
B: Breakage of material
C: Superficial breakage of material
D: Peeling at interface
Note 2 By using RB-73-4 manufactured by Sakai Kagaku Co. as a coating material, the adhesion of coating material was evaluated according to the following criteria:
A: 100/100 in checkers method (excellent)
B: 97–99/100 in checkers method (good)
C: 90–96/100 in checkers method (fair)
D: 89 or less/100 in checkers method (bad)
Note 3 Spiral flow method (injection molding). Moldability was evaluated under the following molding conditions: 170° C., 550 kg/cm², injection time 10 seconds, mold temperature 10° C., flow control: middle position, according to the following criteria:
A: L/T 100 or more (excellent)
B: L/T 50–99 (good)
C: L/T 20–49 (fair)
D: L/T 19 or less (bad)
Note 4 Flow mark, surface roughening and blooming on the surface of molded product were evaluated with the naked eye:
A: Excellent
B: Good
C: Fair
D: Bad
*The same as in Table 1.

Examples 7, 8, 9, 10, 11, 12, 13, 14 and 15

The composition shown in Table 3 were obtained in the same manner as in Examples 3 to 6.

It is apparent from Table 3 that the compositions of this invention (Examples 2, 7, 8, 9, 10, 11, 12, 13, 14 and 15) are flexible, excellent in abrasion resistance, flex-crack resistance, adhesiveness, and paint-compatibility and well balanced in other properties.

It is apparent from Table 4 that, when the proportions of constituent polymers are out of the ranges defined in this invention, the compositions (Comparative Examples 12, 13, 14 and 15) are inferior to the composition of this invention.

That is, the compositions of these comparative examples (Comparative Examples 12-15) have a fault in respect of flexibility, abrasion resistance, moldability and processability and cannot satisfy the performances emphasized in this invention.

TABLE 3

|  |  | \multicolumn{10}{c}{Example} |
| --- | --- | --- | --- | --- | --- | --- | --- | --- | --- | --- | --- |
|  |  | 2 | 7 | 8 | 9 | 10 | 11 | 12 | 13 | 14 | 15 |
| (Polymers constituting composition) (% by wt.) |  |  |  |  |  |  |  |  |  |  |  |
| (A) 1,2-PBD-1* |  | 70 | 70 | 70 | 70 | 70 | 70 |  | 70 | 70 | 70 |
| (A) 1,2-PBD-2 | Note (1) |  |  |  |  |  |  | 70 |  |  |  |
| (C) BR-1* |  | 20 | 10 | 10 | 10 | 10 | 10 | 10 | 20 | 20 |  |
| (C) BR-2 | Note (2) |  |  |  |  |  |  |  |  |  | 20 |
| (D) NR | Note (3) |  | 10 |  |  |  |  |  |  |  |  |
| (D) IR | Note (4) |  |  | 10 |  |  |  |  |  |  |  |
| (D) NBR | Note (5) |  |  |  | 10 |  |  |  |  |  |  |
| (D) SBR | Note (6) |  |  |  |  | 10 |  |  |  |  |  |
| (D) Block copolymer SBR | Note (7) |  |  |  |  |  | 10 |  |  |  |  |
| (D) EPR* |  |  |  |  |  |  |  | 10 |  |  |  |
| (B) PIB-1* |  | 10 | 10 | 10 | 10 | 10 | 10 | 10 |  |  | 10 |
| (B) PIB-2 | Note (8) |  |  |  |  |  |  |  | 10 |  |  |
| (B) PIB-3 | Note (9) |  |  |  |  |  |  |  |  | 10 |  |
| (Properties of composition) |  |  |  |  |  |  |  |  |  |  |  |
| Density* (g/cm³) |  | 0.91 | 0.91 | 0.91 | 0.91 | 0.91 | 0.91 | 0.91 | 0.91 | 0.91 | 0.91 |
| Hardness* (JIS-A) |  | 78 | 78 | 78 | 84 | 80 | 78 | 85 | 79 | 79 | 79 |
| Bending modulus* (kg/cm²) |  | 180 | 180 | 160 | 240 | 200 | 180 | 290 | 190 | 180 | 180 |
| Abrasion resistance* (cc/HP-hr) |  | 15(A) | 30(B) | 20(A) | 20(A) | 30(B) | 30(B) | 30(B) | 15(A) | 15(A) | 17(A) |
| Flexcrack resistance* |  | A | A | A | A | A | A | A | A | A | A |
| Adhesion* |  | A | A | A | B | A | A | A | A | A | A |
| Paint-compatibility* |  | A | A | A | B | A | A | A | A | A | A |
| Moldability** |  | A | A | A | A | A | A | A | A | A | A |

Note (1) Jasr RB-830 (1,2-content 93%, crystallinity 28%, [η] 1.25 dl/g as measured in toluene at 30° C.) manufactured by Japan Synthetic Rubber Co., Ltd.
Note (2) DIENE 35NF (cis-1,4-content 33%, trans-1,4-content 53%, 1,2-content 14%, $ML_{1+4}$ (100° C.) 35) manufactured by ASAHI KASEI Industry Co., Ltd.
Note (3) RSS #1 (unmasticated material)
Note (4) JSR IR 2200 (cis-1,4-content 98%, $ML_{1+4}$ (100° C.) 82) manufactured by Japan Synthetic Rubber Co., Ltd.
Note (5) JSR N 230S (bonded acrylonitrile content 35%, $ML_{1+4}$ (100° C.) 56) manufactured by Japan Synthetic Rubber Co., Ltd.
Note (6) JSR #1500 (bonded styrene content 23.5%, $ML_{1+4}$ (100° C.) 52) manufactured by Japan Synthetic Rubber Co., Ltd.
Note (7) TR #1101 (styrene-butadiene-styrene block copolymer having bonded styrene content of 30% and MI of 1.2 g/10 min) manufactured by Shell Chemical Co.
Note (8) VISTANEX LMM-80 (polyisobutylene having a viscosity average molecular weight of 80,000, and a degree of unsaturation of 0%) manufactured by ESSO Chemical Co., Ltd.
Note (9) JSR BUTYL 365 (isobutylene-isprene copolymer having a viscosity average molecular weight of 44,000, and a degree of unsaturation of 2%) manufactured by Japan Butyl Rubber Co., Ltd.
*The same as in Table 1.
**The same as in Table 2.

Comparative Examples 12, 13, 14 and 15

The compositions shown in Table 4 were obtained in the same manner as in Examples 3 to 6.

TABLE 4

|  |  | Example | \multicolumn{4}{c}{Comparative Example} |
| --- | --- | --- | --- | --- | --- | --- |
|  |  | 2 | 12 | 13 | 14 | 15 |
| (Polymers constituting composition) |  | % by wt. | % by wt. | % by wt. | % by wt. | % by wt. |
| (A) 1,2-PBD | 1,2-content (%) | 92 | 65 | 88 | 97 | 92 |
|  | Crystallinity (%) | 24.5 70 | 12 70 | 0 70 | 45 70 | 17 70 |
|  | [η]*** (dl/g) | 1.2 | 1.2 | 1.8 | 1.2 | 0.6 |
| (C) BR-1* |  | 20 | 20 | 20 | 20 | 20 |
| (B) PIB-1* |  | 10 | 10 | 10 | 10 | 10 |
| (Properties of composition) |  |  |  |  |  |  |
| Hardness* (JIS-A) |  | 78 | — | — | 98(D) | — |
| Bending modulus* (kg/cm²) |  | 180 | — | — | 3400 | — |
| Abrasion resistance* (cc/HP-hr) |  | 15(A) | — | 240(D) | — | 310(D) |
| Flexcrack resistance* |  | A | — | — | — | — |

TABLE 4-continued

|  | Example | Comparative Example | | | |
| --- | --- | --- | --- | --- | --- |
|  | 2 | 12 | 13 | 14 | 15 |
| Moldability** | A | D | — | — | D |

Note:
*The same as in Table 1.
**The same as in Table 2.
***Measured at 30° C. in toluene.

What is claimed is:

1. An uncrosslinked thermoplastic elastomer composition comprising:
   (A) 35-95% by weight of a 1,2-polybutadiene having a 1,2-configuration content of at least 70%, a crystallinity of 5-40% by weight and of at least 0.7 dl/g as measured at 30° C. in toluene,
   (B) 1-20% by weight of an isobutylene homopolymer or an isobutylene-isoprene copolymer,
   (C) 5-40% by weight polybutadiene rubber having a 1,4-configuration content of at least 80%, and
   (D) 0-30% by weight of at least one member selected from the group consisting of isoprene rubber, natural rubber, acrylonitrile-butadiene rubber, styrene-butadiene rubber and ethylene-propylene type rubbers.

2. The composition according to claim 1, wherein $$(B)/\{(C)+(D)\} = 2/1 - 1/20.$$

3. The composition according to claim 1 or 2, wherein ingredient (B) has a degree of unsaturation of 0-5 mole%.

4. The composition according to claim 1 or 2, wherein ingredient (B) has a viscosity average molecular weight of 7,000-80,000.

5. The composition according to claim 1 or 2, wherein ingredient (D) is present in a proportion of 5-20% by weight.

6. The composition according to claim 5, wherein ingredient is present in a proportion of 50-90% by weight, ingredient is present in a proportion of 1-20% by weight and ingredient is present in a proportion of 5-20% by weight.

7. The composition of claim 1, wherein said composition further comprises at least one compounding agent selected from the group consisting of a filler, an oil, a plasticizer, a softening agent, a lubricant, a stabilizer, a foaming agent, and a pigment.

* * * * *